United States Patent [19]

Weder et al.

[11] Patent Number: 5,152,100
[45] Date of Patent: * Oct. 6, 1992

[54] FLOWER POT OR FLOWER POT COVER HAVING CONNECTED AND UNCONNECTED SEGMENTS IN THE SKIRT

[75] Inventors: Donald E. Weder; Joseph G. Straeter, both of Highland, Ill.

[73] Assignee: Highland Supply Corporation, Highland, Ill.

[*] Notice: The portion of the term of this patent subsequent to May 12, 2009 has been disclaimed.

[21] Appl. No.: 832,105

[22] Filed: Feb. 6, 1992

Related U.S. Application Data

[63] Continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ ............................................. A01G 9/02
[52] U.S. Cl. ..................................................... 47/72
[58] Field of Search .................. 47/72, 66; 428/35

[56] References Cited

U.S. PATENT DOCUMENTS 4,773,182  9/1988  Weder ..................................... 47/72
5,111,613  6/1989  Weder ..................................... 47/72

FOREIGN PATENT DOCUMENTS 560532  4/1975  Switzerland ............................ 47/72

Primary Examiner—Richard E. Chilcot, Jr.
Assistant Examiner—Michael A. Van Patten
Attorney, Agent, or Firm—Dunlap, Codding & Lee

[57] ABSTRACT

A flower pot or flower pot cover having a base with an upper end and a lower end, an object opening extending through the upper end of the base. A skirt is connected to the upper end of the base and extends outwardly from the upper end of the base terminating with an outer peripheral surface. The skirt has a plurality of overlapping folds in the skirt extending from the upper end of the base outwardly toward the outer peripheral surface of the skirt. The skirt is divided into a plurality of segments, each segment extending from the upper end of the base radially outwardly to the outer peripheral surface of the skirt. The overlapping folds in some of the segments are connected forming connected segments and the overlapping folds in the remaining segments are unconnected forming unconnected segments.

7 Claims, 1 Drawing Sheet

FLOWER POT OR FLOWER POT COVER HAVING CONNECTED AND UNCONNECTED SEGMENTS IN THE SKIRT

RELATED REFERENCES

This is a continuation-in-part of U.S. Ser. No. 366,588, filed Jun. 15, 1989, entitled PLEATED FLOWER POT OR FLOWER POT COVER, now U.S. Pat. No. 5,111,613, which is a continuation in part of Ser. No. 07/219,083 filed Jul. 13, 1988, now U.S. Pat. No. 4,897,031, which is a continuation of Ser. No. 07/004,275 filed Jan. 5, 1987 now U.S. Pat. No. 4,773,182, which is a continuation of Ser. No. 06/613,080 filed May 22, 1984, which is now abandoned.

This application also relates to U.S. Pat. No. 5,029,412 issued Jul. 9, 1991, entitled FLOWER POT OR FLOWER POT COVER WITH PLEATED SKIRT AND/OR BASE. This application also relates to U.S. Pat. No. 5,073,161 issued Dec. 17, 1991, entitled FLOWER POT OR FLOWER POT COVER WITH CONTROLLED PLEATS. This application also relates to U.S. Ser. No. 7/693,906, filed May 1, 1991, entitled FLOWER POT 0R FLOWER POT COVER WITH PLEATED SKIRT AND/OR BASE. This application also relates to U.S. Ser. No. 07/737,752 filed Jul. 30, 1991, entitled FLOWER POT OR FLOWER POT COVER WITH CONTROLLED PLEATS. This application also relates to U.S. Ser. No. 07/737,752 issued to Jul. 30, 1991, entitled FLOWER POT OR FLOWER POT COVER WITH CONTROLLED PLEATS.

FIELD OF THE INVENTION

The present invention relates to a flower pot or flower pot cover having a skirt divided into segments with each segment extending radially outwardly from the base of the flower pot or flower pot cover wherein the overlapping folds in some of the segments are connected in the overlapping folds in the remaining segments are unconnected.

DESCRIPTION OF THE PREFERRED EMBODIMENTS

Figure 1:
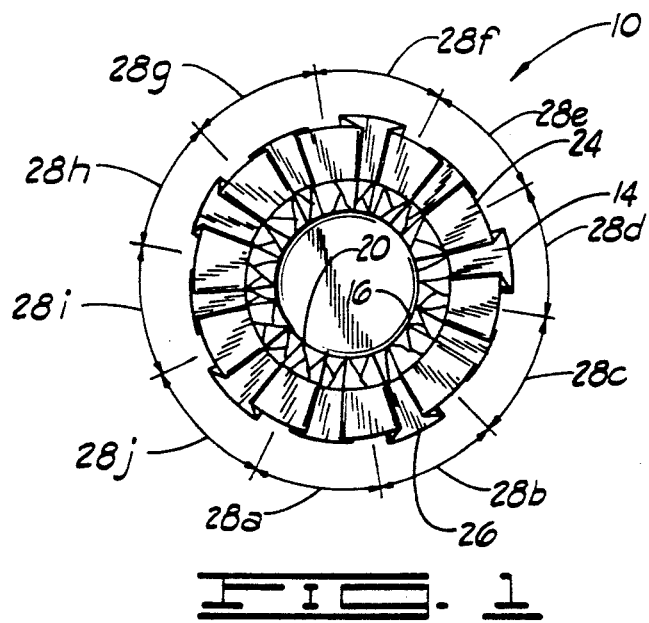
FIG. 1 is a top elevational view of a flower pot or flower pot cover constructed in accordance with the present invention.
Figure 2:
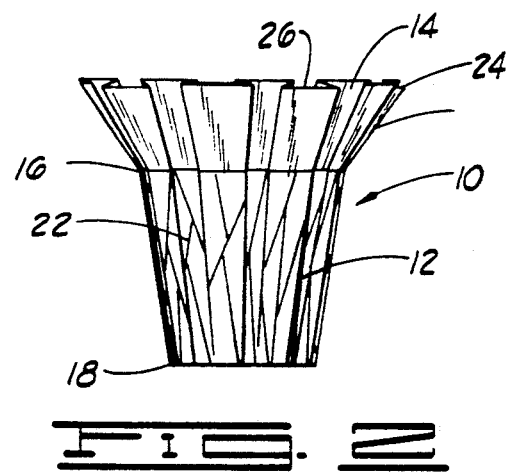
FIG. 2 is a side elevational view of the flower pot or flower pot cover of FIG. 1.
Figure 3:
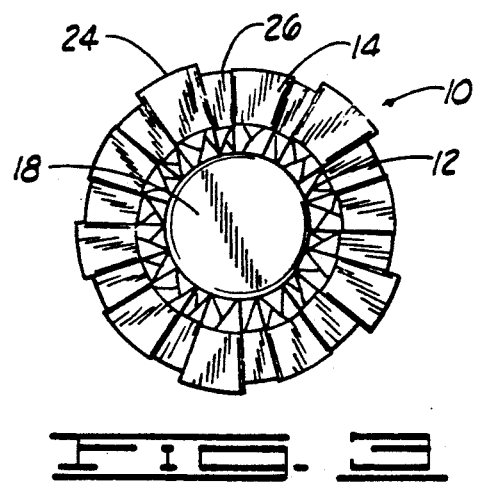
FIG. 3 is a bottom elevational view of the flower pot or flower pot cover of FIGS. 1 and 2.

Shown in FIGS. 1, 2 and 3 and designated therein by the general reference numeral 10 is a flower pot or flower pot cover constructed in accordance with the present invention. In one embodiment, the article shown in the drawings as a flower pot cover which is adapted to provide a decorative cover for a flower pot. In one other embodiment, the article shown in the drawings is a flower pot which is adapted to support a floral groupings (defined below) in a manner well known in the art.

The flower pot or flower pot cover 10 comprises a base 12 (FIGS. 2 and 3) and a skirt 14 (FIGS. 1, 2 and 3).

The base 12 has an upper end 16 (FIGS. 1 and 2) and a lower end 18 (FIGS. 2 and 3). An object opening 20 (FIG. 1) is formed through the upper end 16 and the object opening 20 extends a distance through the base 12 with the base 12 substantially encompassing the object opening 20, except for the open upper end 16 of the base 12.

The base 12 has a plurality of overlapping folds 22 (only one of the overlapping folds 22 being specifically designated by the reference numeral in FIG. 2) which extend at various angles and which have different and various lengths. The overlapping folds 22 in a preferred form are substantially fixed or connected. The overlapping folds cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with the an outer peripheral surface 24. A plurality of overlapping folds 26 (only one of the folds 26 being designated with a reference numeral in FIGS. 1, 2 and 3) are formed in the skirt 14. Each of the folds 26 extends generally from the upper end 16 of the base 12 radially outwardly toward the outer peripheral surface 24 of the skirt 14.

The skirt 14 is divided into a plurality of segments 28 with each segment 28 extending from the upper end 16 of the base 12 radially outwardly to the outer peripheral surface 24 of the skirt 14. Each of the segments 28 extends a distance circumferentially about the skirt 14. The individual segments are designated in FIGS. 1 and 2 by the specific reference numerals 28a, 28b, 28c, 28d, 28e, 28f, 28g, 28h, 28i and 28j.

The folds 26 in some of the segments 28 are connected or fixed forming connected segments, while the folds in the remaining segments 28 are unconnected forming unconnected segments. As illustrated in FIGS. 1 and 2, the folds in the segments 28a, 28c, 28e, 28g and 28i are connected forming connected segments and the folds in the segments 28b, 28d, 28f, 28h and 28j are unconnected forming unconnected segments. Each unconnected segment 28b, 28d, 28f, 28h and 28j is disposed between two of the connected segments 28a, 28c, 28e, 28g and 28i, respectively. The connected segments and unconnected segments provide an overall pleated appearance to the skirt 14. The folds 26 may be connected with an adhesive or cohesive or heat sealed.

In a preferred form, the flower pot or flower pot cover 10 is preformed from a sheet of material in a manner substantially like that described in the patent entitled "Article Forming System", U.S. Pat. No. 4,773,182 issued on Sep. 27, 1988 and in the co-pending continuation patent application entitled "Article Forming System", U.S. Ser. No. 219,083, filed Jul. 13, 1988, which specifically are incorporated herein by reference. Since the disclosures in this patent and patent application have been incorporated herein by reference, no further description of the forming of the flower pot or flower pot cover 10 is deemed necessary herein.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polypropylene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polypropylene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

Changes may be made in the construction of the flower pot or flower pot cover 10 as described herein without departing from the spirit and scope of the invention as defined in the following claims.

What is claimed is:

1. A flower pot or flower pot cover, comprising:
   a base having an upper end and a lower end with an object opening extending through the upper end of the base; and
   a skirt connected to the upper end of the base and extending outwardly from the upper end of the base terminating with an outer peripheral surface, the skirt having a plurality of overlapping folds formed therein, the skirt being divided into a plurality of segments with each segment extending from the upper end of the base radially outwardly to the outer peripheral surface of the skirt and each segment extending a distance circumferentially about the skirt, the overlapping folds in some of the segments being connected forming connected segments and the overlapping folds in the remaining segments being unconnected forming unconnected segments.

2. The flower pot or flower pot cover of claim 1 wherein each of the unconnected segments is defined further as being disposed between two connected segments.

3. The flower pot or flower pot cover of claim 1 wherein the overlapping folds in the base substantially are permanently fixed.

4. The flower pot or flower pot cover of claim 1 wherein the flower pot or flower pot cover is constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

5. The flower pot or flower pot cover of claim 1 wherein the base and the skirt are each defined further as having a thickness in a range from less than about 1.0 mil to about 30 mils.

6. The flower pot or flower pot cover of claim 1 wherein the base and the skirt each are defined further as having a thickness of less than about 6 mils.

7. The flower pot or flower pot cover of claim 1 wherein the overlapping folds in the skirt are defined further as extending from about the upper end of the base radially outwardly to about the outer peripheral surface of the skirt.

* * * * *